(12) United States Patent
Fattal et al.

(10) Patent No.: US 8,678,600 B2
(45) Date of Patent: Mar. 25, 2014

(54) OPTICAL STAR COUPLER

(75) Inventors: David A. Fattal, Mountain View, CA (US); Michael Renne Ty Tan, Menlo Park, CA (US); Marco Fiorentino, Mountain View, CA (US); Huei Pei Kuo, Cupertino, CA (US); Wayne V. Sorin, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/387,010

(22) PCT Filed: Mar. 19, 2010

(86) PCT No.: PCT/US2010/027902
§ 371 (c)(1),
(2), (4) Date: Jan. 25, 2012

(87) PCT Pub. No.: WO2011/115624
PCT Pub. Date: Sep. 22, 2011

(65) Prior Publication Data
US 2013/0003185 A1 Jan. 3, 2013

(51) Int. Cl.
*G02B 5/08* (2006.01)
*G02B 27/14* (2006.01)
*G02B 23/08* (2006.01)

(52) U.S. Cl.
CPC ........................................ *G02B 23/08* (2013.01)
USPC .......................................... 359/857; 359/633

(58) Field of Classification Search
USPC .................. 359/629, 633, 636, 850, 857, 861
See application file for complete search history.

(56) References Cited

U.S. PATENT DOCUMENTS

| | | | |
|---|---|---|---|
| 4,365,864 A | 12/1982 | Cowley et al. | |
| 4,714,313 A | 12/1987 | Kapany et al. | |
| 4,904,042 A | 2/1990 | Dragone | |
| 4,943,136 A | 7/1990 | Popoff et al. | |
| 5,140,655 A | 8/1992 | Bergmann | |
| 5,165,080 A | 11/1992 | Healey | |
| 5,430,816 A | 7/1995 | Furuya et al. | |
| 5,742,717 A | 4/1998 | Saitoh | |
| 5,894,535 A | 4/1999 | Lemoff et al. | |
| 6,999,156 B2 | 2/2006 | Chou et al. | |
| 7,357,005 B2 | 4/2008 | Matsumura et al. | |
| 2003/0175006 A1 | 9/2003 | Wildeman et al. | |
| 2004/0161200 A1 | 8/2004 | Singh et al. | |
| 2005/0036125 A1 | 2/2005 | Kremer et al. | |

FOREIGN PATENT DOCUMENTS

| | | |
|---|---|---|
| JP | 57040205 | 3/1982 |
| TW | I234952 | 6/2005 |
| WO | WO-2011008216 | 1/2011 |

*Primary Examiner* — William Choi

(57) ABSTRACT

An optical device may include a light transmissive medium having two sides. On one side may be a high reflectivity mirror and on the other side may be a plurality of partial reflectivity mirrors that may be guided mode resonance or nanodot mirrors. An optical system may have a plurality of light inputs, a light transmissive medium, and a plurality of light outputs from the light transmissive medium The light transmissive medium may have a high reflectivity mirror on one side and a plurality of partial reflectivity mirrors on a second side.

13 Claims, 8 Drawing Sheets

OPTICAL STAR COUPLER

BACKGROUND

An optical coupler is an optical device that may have a single light input and one or more light outputs. An optical star coupler (or splitter) generally has N (N≥2) outputs, and is often referred to as a 1×N star coupler. It can be used in applications to distribute a stream of data from a single source to multiple outputs.

Figure 1:
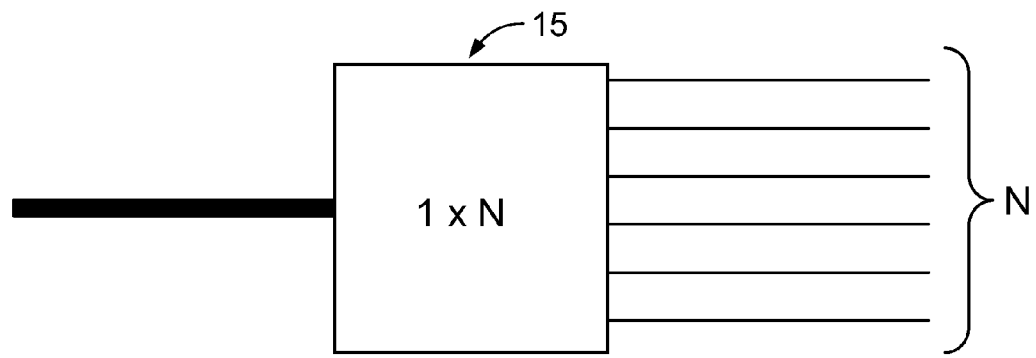
FIG. 1 is a conceptual illustration of a 1×N star coupler according to embodiments of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Embodiments of the present invention may be used in a variety of applications. Although the present invention is not limited in this respect, the circuits and techniques disclosed herein may be used in many apparatuses such as fiber-optic communications systems, fiber-optic cable TV systems, mainframe computers, server computers, personal computers (PCs), consumer electronics, and integrated circuits in many products and systems, and the like.

Reference is now made to FIG. 1, which is a conceptual illustration of 1×N star coupler 15 according to embodiments of the invention. The single input is split into N outputs (the figure shows N=6). The thickness of the lines in the figure corresponds to the relative amount of power in the input and output lines—the outputs may each provide approximately 1/N the power of the input. As will be discussed below, the outputs are not necessarily equal in power (or even substantially equal in power), depending on the fabrication parameters of the star coupler.

Figure 2A:
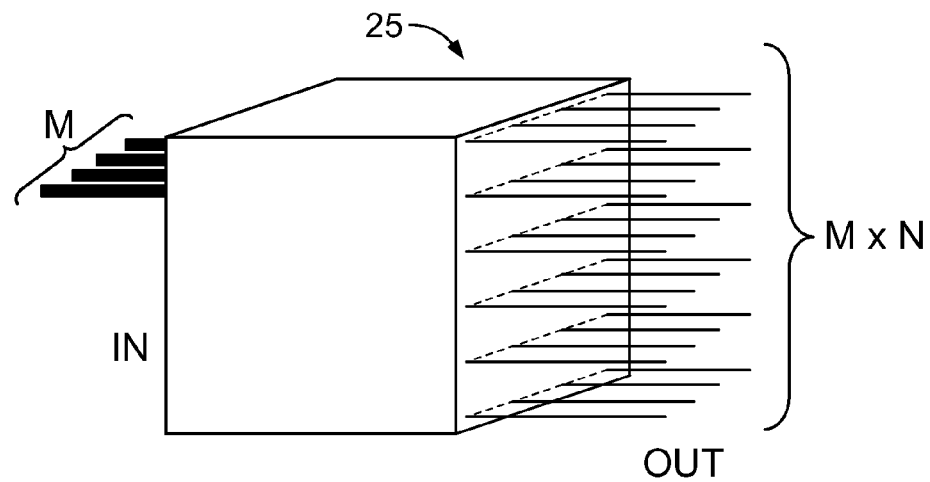
FIGS. 2A-2B are conceptual illustrations of a star coupler that provides M×N outputs according to embodiments of the invention.
Figure 2B:
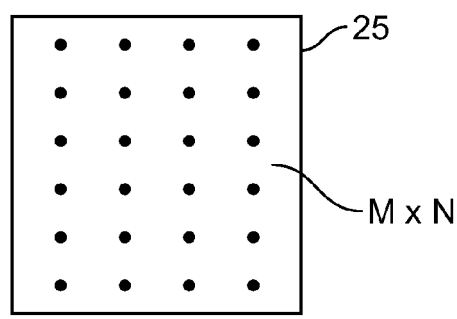

Reference is now made to FIGS. 2A-2B, which are conceptual illustrations of star coupler 25 that provides M×N outputs according to embodiments of the invention. Star coupler 25 has M inputs (shown as M=4 in FIG. 2A), and each input can generate N outputs (shown as N=6 in FIG. 2A). Thus, star coupler 25 can generate an array of M×N outputs (shown as 4×6=24 in FIGS. 2A and 2B). FIG. 2B shows a head-on view of the output face of star coupler 25. Note that this M×N output configuration differs from configurations often called "M×N star couplers" (see, e.g., U.S. Pat. No. 5,140,655) that have M inputs and N outputs. Although the outputs are shown in a rectangular array, differently-shaped arrays are possible, such as circular, oval, elliptical, etc.

Figure 3A:
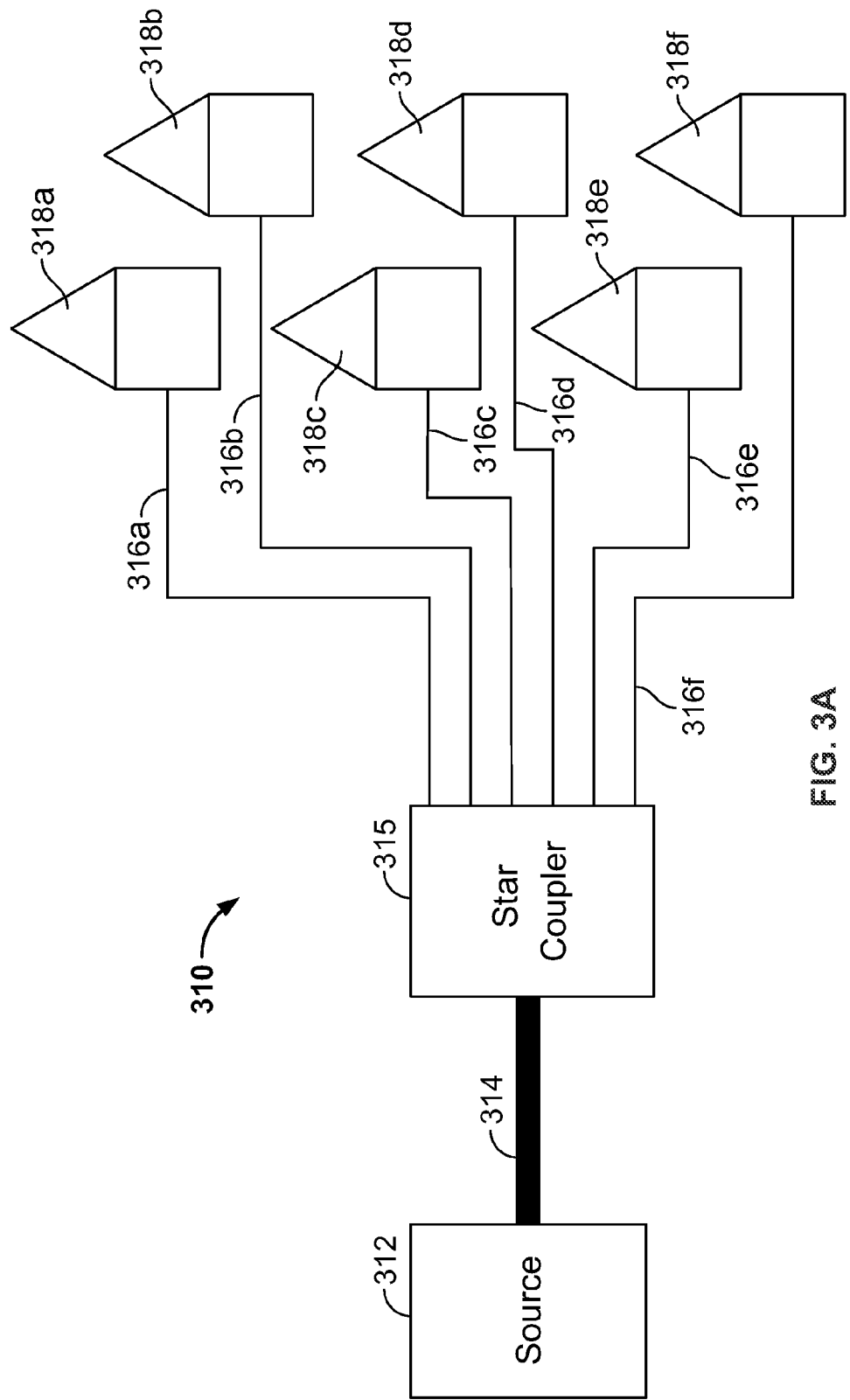
FIGS. 3A-3C are conceptual illustrations of star coupler systems according to embodiments of the invention.
Figure 3B:
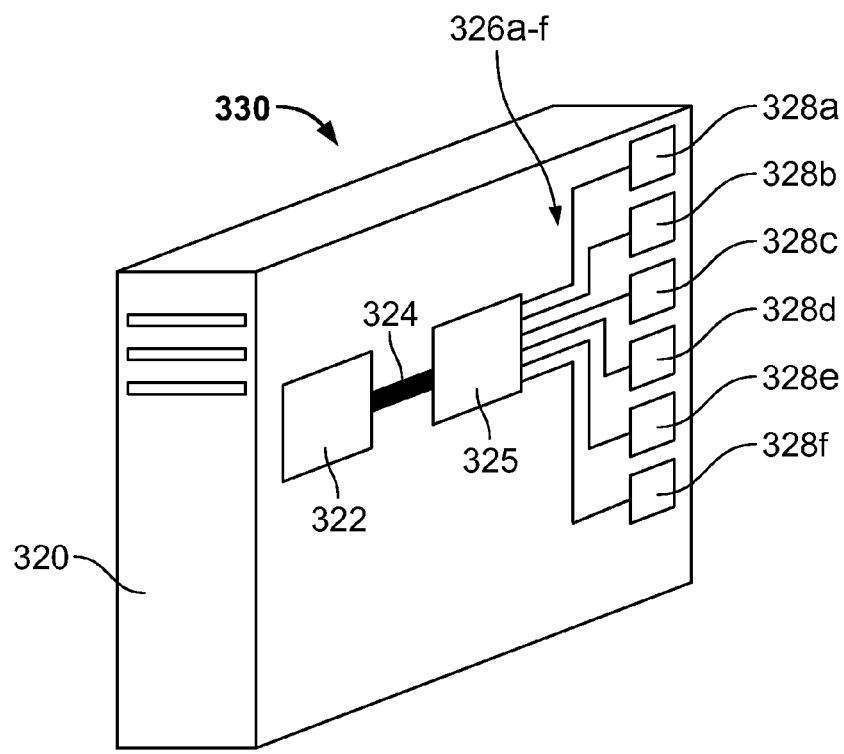
Figure 3C:
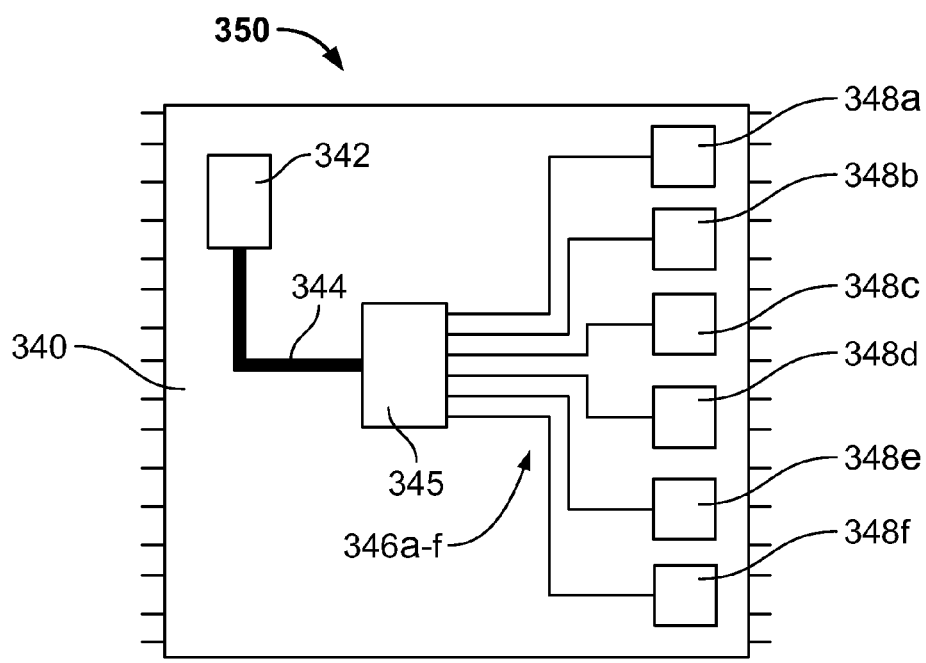

Reference is now made to FIGS. 3A-3C, which are conceptual illustrations of star coupler systems of different scales according to embodiments of the invention. In FIG. 3A, star coupler system 310 can be a broadcast network (e.g., telephone, TV, internet, etc.) having a light source 312, fiberoptic input 314, star coupler 315, fiberoptic outputs 316a-f, and destinations 318a-f. Light source 312 can be the head-end (or headend) of a cable TV system, a local office of a telephone system, or the office of an Internet Service Provider (ISP) in an Internet broadcast system, or an intermediate light source in the field. In each case, light source 312, which may be a laser or other light source, may provide light (or light pulses) to fiberoptic input 314, which may be a fiberoptic cable or other fiber medium or waveguide. Depending on the distance between light source 312 and star coupler 315, there may be optical or electrical amplifiers along the way. Star coupler 315 can be a 1×N coupler or have M×N outputs, although for ease of illustration it is shown in FIG. 3A as a 1×6 coupler, in which the single fiberoptic input 314 is split into six outputs 316a-f. Each of the six outputs 316a-f is then routed to a destination 318a-f, which may be a house or an office or even another star coupler, as might be found in an FTTx architecture.

FIG. 3B illustrates star coupler system 330, which is on a smaller scale than system 310. System 330 includes computer 320, which houses light source 322, star coupler 325, and destinations 328a-f. Computer 320 can be a desktop or laptop PC, or a mainframe or server computer, for example. As in system 310, star coupler 325 can be a 1×N coupler or have M×N outputs. Light source 322 can be a laser whose output is controlled by a microprocessor that wants to send data to other parts of the computer. Light source 322 may be coupled to star coupler 325 via fiberoptic input 324, such as a waveguide or optical fiber. Destinations 328a-f can be modules in the computer, e.g., memory modules, display modules, storage modules, etc., individual chips or integrated circuits, or other star couplers. Destinations 328a-f could also be directly coupled to optical outputs of computer 320 (or coupled to computer outputs via buffers), so that the optical outputs may be made available outside of the computer, for example as an input to a CD or DVD player. One example of star coupler system 330 may be an optical backplane configuration.

FIG. 3C illustrates star coupler system 350, which is on a smaller scale than system 330. In this case, system 350 may be found within an integrated circuit 340. System 350 may include light source 342, star coupler 345, and destinations 348a-f. Integrated circuit 340 can be a single integrated circuit chip, a system-on-a-chip (SoC), a system-in-a-package (SiP), or other small-scale system. As in systems 310 and 330, star coupler 345 can be a 1×N coupler or have M×N outputs. Light source 342 can be a laser or LED, whose output may be controlled by a processor or controller, that desires to send data or information to other parts of the integrated circuit 340. Light source 342 may be coupled to star coupler 345 via fiberoptic input 344, which can be an optical waveguide or fiber. Destinations 348a-f can be modules in the integrated circuit, e.g., memory blocks, I/O blocks, etc., or other star couplers. Destinations 348a-f could also be directly coupled to optical outputs of integrated circuit 340 (or coupled to integrated circuit outputs via buffers), so that the optical outputs may be made available outside of the integrated circuit.

Figure 4:
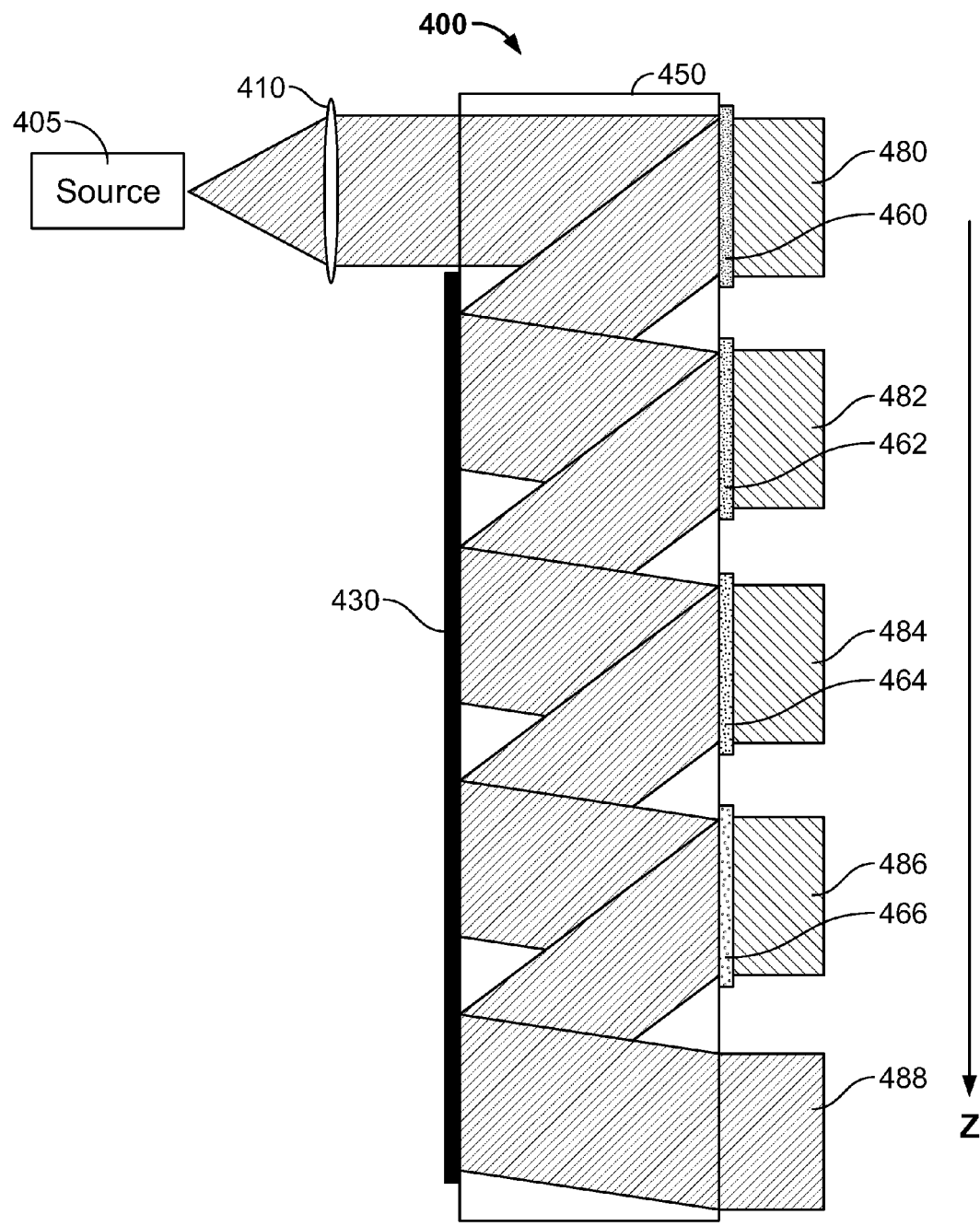
FIG. 4 is a conceptual illustration of a star coupler according to embodiments of the invention.

Reference is now made to FIG. 4, which is a conceptual illustration of star coupler 400 according to embodiments of the invention. This figure shows how the star coupler generates multiple outputs for a single input, using high and partial reflectivity mirrors sandwiched around a light transmissive medium. More specifically, light transmissive medium 450 is shown with a high reflectivity mirror 430 on one side and partial reflectivity mirrors 460-466 on the other side. One arrangement of mirrors may be that partial reflectivity mirrors 460-466 have progressively decreasing reflectivity or reflectance (or, alternatively, progressively increasing transmittance or transmissivity) in the Z direction, so that outputs 480-488 can have substantially equal power, if so desired. Other arrangements of mirrors result in different output light powers. Also shown in FIG. 4 is lens 410, which may be used to focus and collimate the light output from light source 405. The partial reflectivity mirrors may be polarization independent and can handle single-mode or multi-mode inputs.

Light transmissive medium 450 (sometimes called a substrate or a slab) may be made of quartz or glass ($SiO_2$), which have a refractive index (index of refraction) n equal to approximately 1.5. Partial reflectivity mirrors 460-466 and high reflectivity mirror 430 may be made of dielectric materials having an index of refraction greater than that of light transmissive medium 450. Examples of such materials are silicon (Si), with n~3.4, and silicon nitride ($Si_3N_4$), with n~2. Different reflectivities can be achieved for the mirrors by adjusting the number of dielectric layers—more layers typically provide higher reflectivity. These dielectric mirrors can be deposited onto the substrate or glued on.

Other ways of making the partial reflectivity mirrors exist. Partial reflectivity mirrors 460-466 may be guided mode resonant (GMR) mirrors. GMR mirrors may be built by depositing or growing on the substrate a material having a higher index than that of the substrate, such as Si or $Si_3N_4$. The higher index layer has a thickness that is smaller than the wavelength of the light that the mirror is intended to reflect. The high index layer is then etched to form a sub-wavelength grating that can be one-dimensional (e.g., a set of grooves) or two-dimensional (e.g., an array of holes or pillars). The grating can be periodic or non-periodic depending on whether one desires to tilt or focus the beam. Moreover, different gratings can produce different reflectivities.

Thus, these GMR mirrors differ from and have certain advantages over the dielectric mirrors mentioned above in several ways. First, the GMR mirrors typically have only one layer. Light can be reflected from GMR mirrors at different angles depending on the grating pattern, the GMR mirrors can be built using planar technology, including planar silicon technology, and the differing reflectivities of the GMR mirrors can be produced during the lithography process. In addition, GMR mirrors can be designe focus t d to act as curved, parabolic mirrors as well as "tilted" mirrors, so as to direct and/or he light beam. These features simplify the layout of the star coupler and the alignment of the mirrors, thus making the fabrication of the star coupler less expensive. Methods of making these GMR mirrors are disclosed, for example, in commonly-owned Patent App. Serial No. PCT/US2009/051026, entitled, "Non-Periodic Grating Reflectors With Focusing Power And Methods For Fabricating The Same," filed Jul. 17, 2009, the disclosure of which is hereby incorporated by reference.

Another method of making the partial reflectivity mirrors is to use "nanodot" technology. "Nanodots" (sometimes called "quantum dots") are sub-wavelength dots (on the order of a nanometer) made of a metal or dielectric material that can be deposited on a substrate (such as light transmissive medium 450) in which the open area of the dots provides transmittance and, conversely, the closed area of the dots provides reflectance. Alternatively, nanodots may be etched out of a material deposited on a substrate to create nanodot gratings. Nanodots may be made from Si or Ge or ZnO, for example. A nanodot mirror provides minimal perturbation to the light wave (as compared with over-wavelength dot patterns).

High reflectivity mirror 430 can be made in several ways, similar to the ways partial reflectivity mirrors can be made. These ways include depositing layers of dielectric material to form a mirror, depositing a continuous metal layer, or using the GMR technique, as described above.

The drawing of FIG. 4 shows a 1×N star coupler, where N=5, but N can be any number greater than 1. A typical number for N may be 6 to 8, but there is no reason why N could not be as much as 12 or 15, depending on the input laser power, the desired output light powers, and the relative reflectivities of the partial reflectivity mirrors. In addition, star coupler 400 is shown having outputs uniformly spaced from each other. This is a design choice, for example if the light from the star coupler is coupled into uniformly-spaced optical fibers used to transmit the output light to the destinations. Typical spacings can be 250 µm (0.25 mm), although other spacings are possible, and depend on the amount of space available for the output fibers, the size of the output fibers, among other factors. As can be seen from FIG. 4, the number of outputs corresponds to the number of partial reflectivity mirrors—there is generally one more output than partial reflectivity mirror, but there could be the same number of outputs as partial reflectivity mirrors.

Figures 5A, 5B:
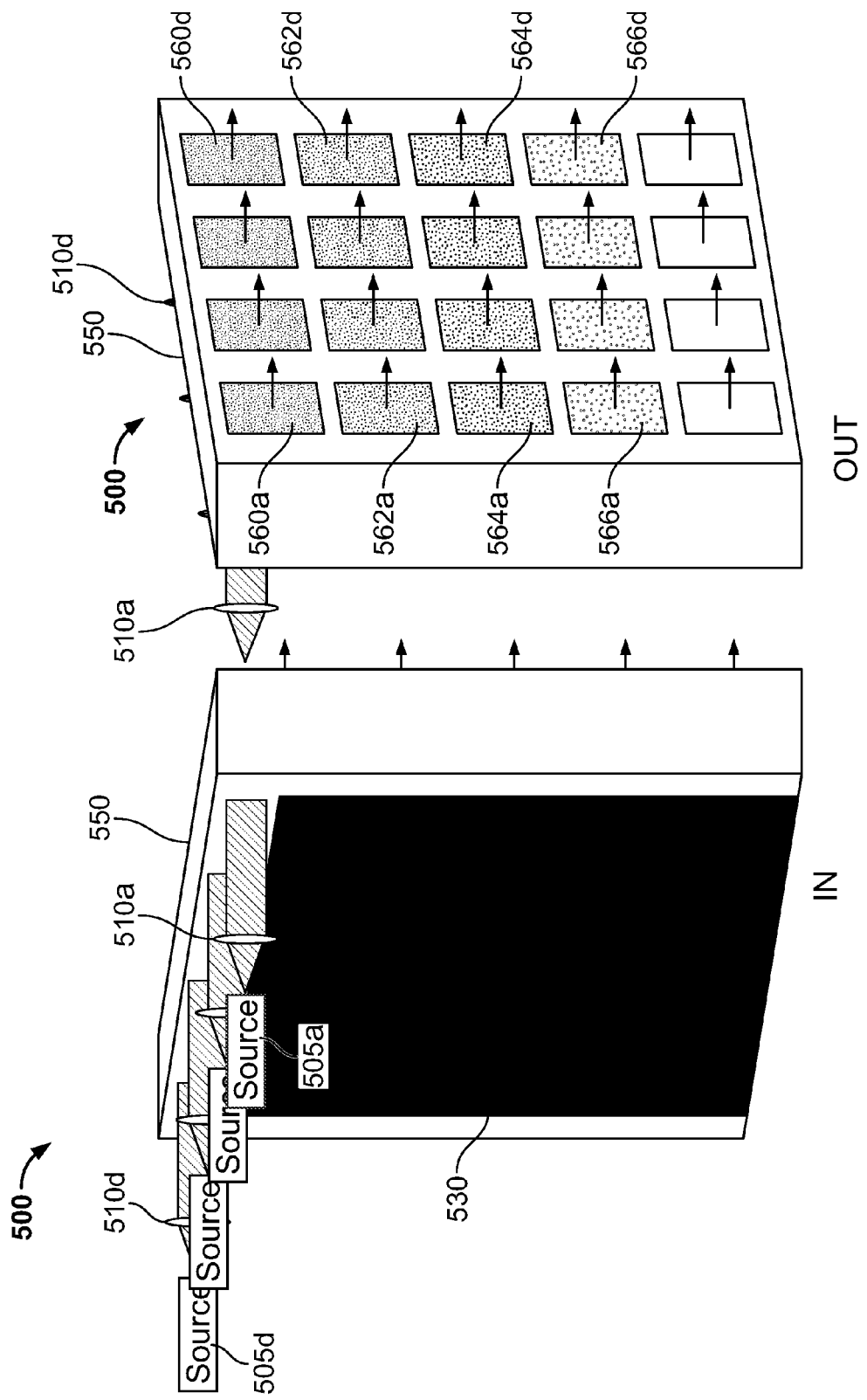
FIGS. 5A-5B are conceptual illustrations of a star coupler according to other embodiments of the invention.

In addition, the star coupler may include multiple inputs M, which can produce M×N outputs, an embodiment of which is shown in FIGS. 5A and 5B. FIG. 5A shows star coupler 500 with M=4 light sources 505a-d transmitting light through M=4 lenses 510a-d, which then enters light transmissive medium 550. FIG. 5B shows partial reflectivity mirrors 560a-d through 566a-d that partially reflect the light toward high reflectivity mirror 530 and transmit some light to the outputs (which, for clarity's sake, are shown as simple arrows). As discussed above, the reflectivity of the mirrors can progressively decrease in the Z direction so that the relative power at the outputs can be controlled, and be substantially the same if desired. Moreover, FIG. 5B shows that the M×N output array can have uniform spacing in one or both dimensions, where the horizontal spacing may, but does not have to, equal the vertical spacing. A star coupler in production having 6 inputs and 6×12 outputs with 250 µm spacing could thus have a size on the order of 5 mm×5 mm×1 mm thick. As can be seen from FIG. 5B, the number of outputs corresponds to the number of partial reflectivity mirrors and the number of inputs. For example, there may be one more output than partial reflectivity mirror for each input (e.g., for N outputs, there may be N−1 partial reflectivity mirrors and for M×N outputs there may be M×(N−1) partial reflectivity mirrors), but there could be the same number of outputs as partial reflectivity mirrors.

Figure 6:
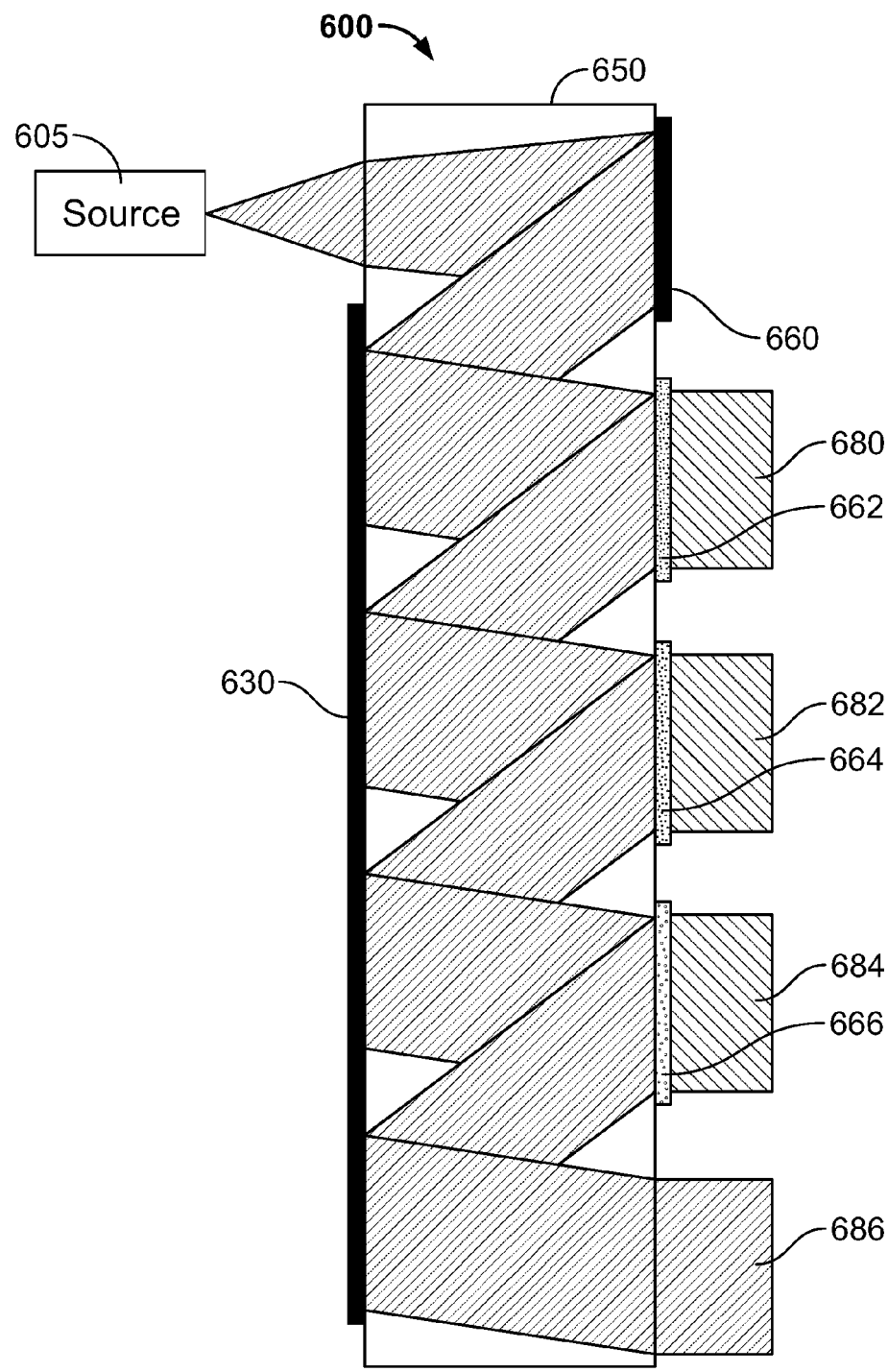
FIG. 6 is a conceptual illustration of a star coupler according to other embodiments of the invention.

Reference is now made to FIG. 6, which is a conceptual illustration of a star coupler 600 according to other embodiments of the invention. Star coupler 600 is similar to star coupler 400, but instead of lens 410, it includes high reflectivity mirror 660 that also acts as a collimator. High reflectivity mirror 660 may be a GMR mirror, which can be designed to collimate and direct light. Mirrors 662-666 and 630 can be the same as mirrors 462-468 and 430, respectively. One advantage of this embodiment is that it may be easier, less expensive, and more robust to manufacture high reflectivity mirror 660 than it is to include a collimating lens, such as lens 410. Note that because one of the output mirrors is now a high reflectivity mirror, there is one less output from the star coupler. The power emitted from outputs 680-686 can be adjusted to account for the fewer outputs, if desired, by modifying the reflectivity of mirrors 662-666. In the case of star coupler 600, the N outputs correspond to the N−1 partial reflectivity mirrors.

Just as 1×N star coupler 400 can be modified to produce 1×N star coupler 600 by using high reflectivity mirror 660 instead of lens 410 and partial reflectivity mirror 460, M×N output coupler 500 can be modified to use high reflectivity mirrors. One such embodiment may have high reflectivity mirrors that also act as collimators in place of partial reflectivity mirrors 560a-d and lenses 510a-d. Note that because one of the output mirrors per input is now a high reflectivity mirror, there is one less output per star coupler input. The power emitted from these outputs can be adjusted by modifying the reflectivity of mirrors 562-566. In the case of modified star coupler 500, the M×N outputs correspond to the M×(N−1) remaining partial reflectivity mirrors.

Figure 7A:
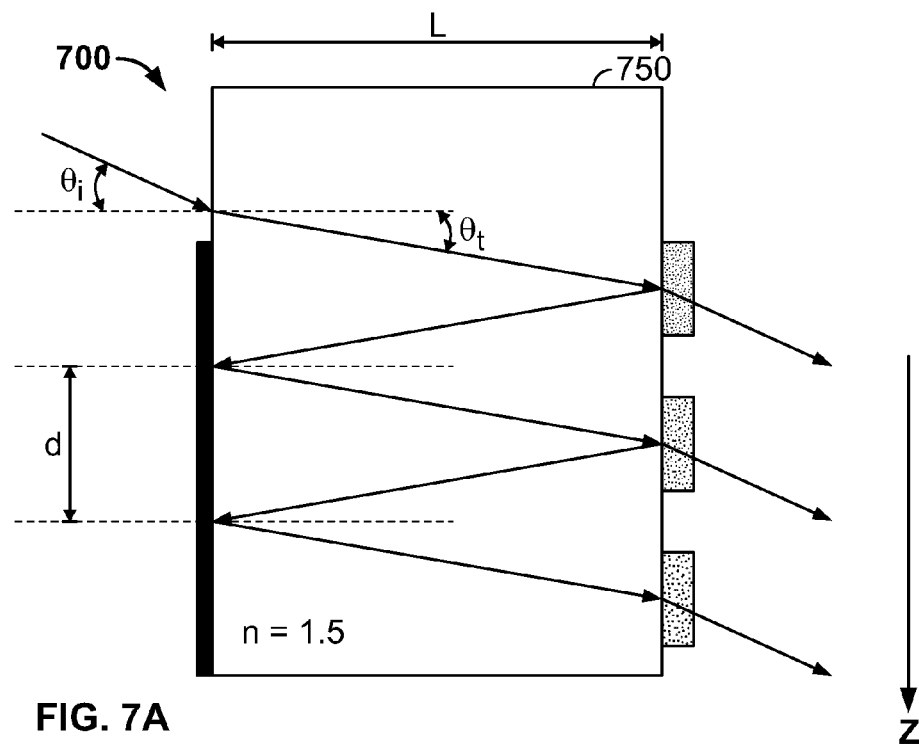
FIGS. 7A-7B are conceptual illustrations of a star coupler illustrating design parameters according to embodiments of the invention.
Figure 7B:
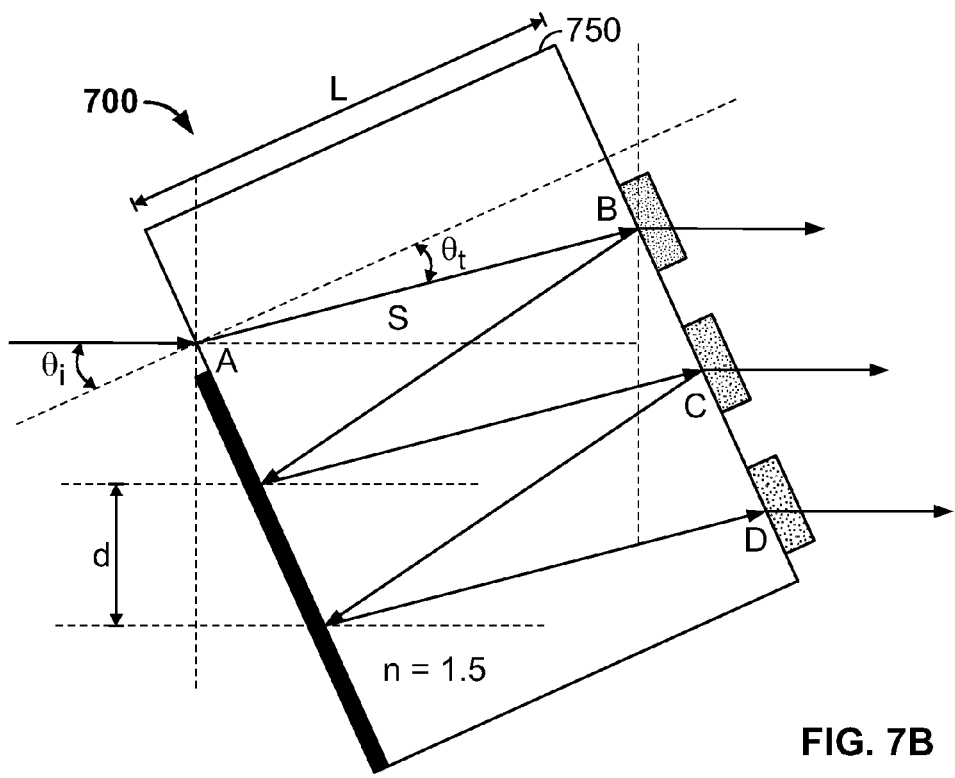

Reference is now made to FIGS. 7A-7B, which are conceptual illustrations of star coupler 700 illustrating design parameters according to embodiments of the invention. Star coupler 700 may have light transmissive medium 750 having a refractive index=1.5, and can be a 1×N coupler or have M×N outputs. If we know d, the vertical spacing between outputs, and L, the width of light transmissive medium 750, then we can solve for $\theta_i$ and $\theta_t$, the incident angles of the light beam, as follows. From FIG. 7A, we can see that $$\theta_t = \tan^{-1}\left(\frac{d}{2L}\right). \quad (1)$$

Snell's Law relates the angle of incidence to the angle of refraction at an interface between two indices of refraction, and states that $$n_i \sin \theta_i = n_t \sin \theta_t, \quad (2)$$

where n=refractive index of the respective medium and θ=angle of incidence of the light (subscript i is for air, in this case, and subscript t is for the light transmissive medium). So, from Snell's Law, $$\theta_i = \sin^{-1}(n_t \sin(\theta_t)/n_i). \quad (3)$$

For $n_i=1$ and $n_t=1.5$, and specific values of L and d, we can derive the following values in Table 1 from equations (1) and (3):

TABLE 1

| L | d | $\theta_i$ | $\theta_t$ |
|---|---|---|---|
| 0.625 mm | 0.250 mm | 17.108° | 11.310° |
| 1.25 mm | 0.250 mm | 8.584° | 5.711° |
| 2.50 mm | 0.250 mm | 4.296° | 2.862° |
| 5.00 mm | 0.250 mm | 2.148° | 1.432° |

In FIG. 7B, star coupler 700 may be placed at an angle, so that the input and output rays are horizontal. The parameter s, the distance the light travels from one side of light transmissive medium 750 to the other, equals $$\sqrt{L^2 + \frac{d^2}{4}},$$

producing the following values in Table 2:

TABLE 2

| L | d | s | $\theta_i$ | $\theta_t$ |
|---|---|---|---|---|
| 0.625 mm | 0.250 mm | 0.637 mm | 17.108° | 11.310° |
| 1.25 mm | 0.250 mm | 1.256 mm | 8.584° | 5.711° |
| 2.50 mm | 0.250 mm | 2.503 mm | 4.296° | 2.862° |
| 5.00 mm | 0.250 mm | 5.002 mm | 2.148° | 1.432° |

Coordinates A, B, C, and D are added to the drawing. If the coordinates of A are assumed to be (0,0), then the coordinates of B are $s(\cos(\theta_i-\theta_t), \sin(\theta_i-\theta_t))$ and of C are $(B_x+d \sin \theta_i, B_y-d \cos \theta_i)$. FIGS. 7A and 7B show how tilting a dielectric or nanodot mirror, for instance, can provide benefits of embodiments of the invention. GMR mirrors can also be placed at an angle, or can be designed to tilt the beam without actually being tilted themselves.

Figure 8A:
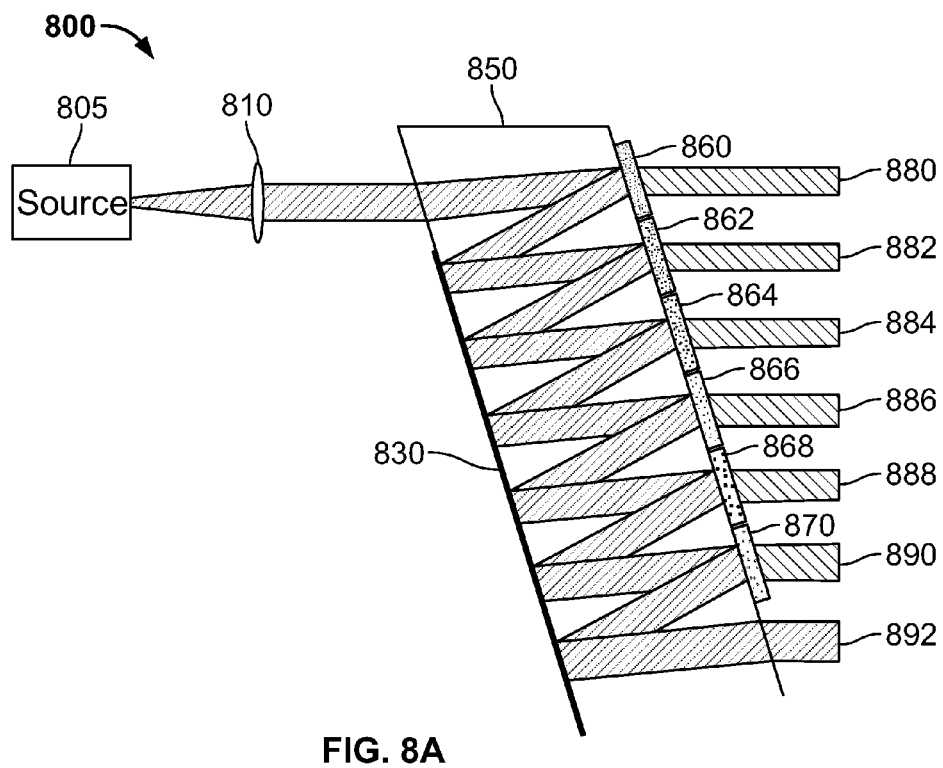
FIGS. 8A-8B describe the results of a Monte Carlo simulation of an embodiment of the invention in operation.
Figure 8B:
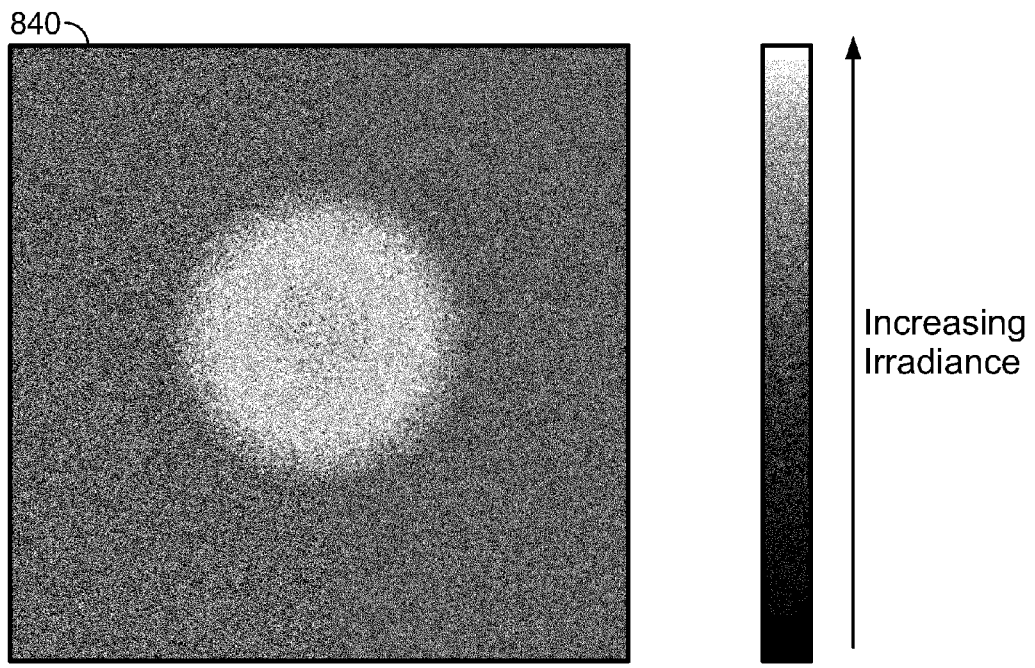

Reference is now made to FIGS. 8A-8B, which describe the results of a Monte Carlo simulation of an embodiment of the invention in operation, a 1×7 star coupler 800 (although the simulation could be performed on a coupler having M×N outputs). Light source 805 is a vertical cavity surface emitting laser (VCSEL) with an R=10 μm, a numerical aperture (NA) of 0.12, and an output power of 1 mW (in production, a star coupler could receive light from a source having output power in the 0.5-100 mW range). Lens 810 can be an OMRON lens model number P1L12A-C2. The following table shows the reflectance of each of the partial reflectivity mirrors 860-870 used in the simulation and the resulting output power at outputs 880-892 (note that although there is no mirror at tap 7 (output 892), there is a 4% reflectance between light transmissive medium 850 and air):

TABLE 3

| Output # | Reflectance | Tapped Power |
|---|---|---|
| 1 (880) | 90% | 96 μW |
| 2 (882) | 90% | 80 μW |
| 3 (884) | 85% | 99 μW |
| 4 (886) | 80% | 103 μW |
| 5 (888) | 70% | 113 μW |
| 6 (890) | 50% | 116 μW |
| 7 (892) | 4% | 100 μW |

The ratio of the highest output power to the lowest is 116/80=1.45, which can be considered substantially uniform.

FIG. 8B shows the output pattern of the first output (output 880) of star coupler 800 as a result of the Monte Carlo simulation. The size of detector 840 is 0.2 mm×0.2 mm, and all of the light falls within the center 0.1 mm×0.1 mm, so spacing the outputs of star coupler 800 by 250 μm (0.25 mm) does not degrade the outputs. The scale shows that the higher irradiated points appear in an annulus approximately 0.025 mm from the center and 0.0125 mm wide.

In sum, an optical star coupler is described that may provide N outputs from a single input or M×N outputs from M inputs in a 2D array. The output taps may be created using partial reflectivity mirrors having progressively decreasing reflectivity as the light propagates through the star coupler. These partial reflectivity mirrors may be dielectric, guided mode resonant (GMR) mirrors, or nanodot mirrors. GMR mirrors have a constant thickness and their reflectivity can be tuned by etching sub-wavelength gratings on them. A star coupler according to embodiments of the invention may be fabricated more simply, robustly, and less expensively. GMR mirrors can collimate light, so one may be used as a high reflectivity collimating mirror to obviate a need or desire to use a separate collimating lens. Moreover, GMR mirrors can be tilted or direct the curvature or phasefront of the light beam so as to change the exit angle from the coupler without physically changing the orientation of the mirrors. Other or different benefits may also be achieved.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. An optical device comprising:
   a light transmissive medium having a first side and a second side;
   a high reflectivity mirror disposed on said first side of said light transmissive medium; and
   a plurality of partial reflectivity mirrors disposed along said second side of said light transmissive medium,
   wherein the partial reflectivity mirrors comprise guided mode resonance or nanodot mirrors.

2. The device of claim 1, further comprising a high reflectivity mirror disposed on said second side for reflecting and collimating light to said light transmissive medium.

3. The device of claim 1, further comprising a lens for collimating light to said light transmissive medium.

4. The device of claim 1, wherein at least one of said partial reflectivity mirrors acts as a tilted mirror.

5. The device of claim 1, wherein at least one of said partial reflectivity mirrors acts as a curved mirror.

6. The device of claim 1, wherein said partial reflectivity mirrors have progressively decreasing light reflectivity.

7. An optical system comprising:
   a plurality of light inputs to receive light;
   a light transmissive medium having a first side and a second side, the light transmissive medium receiving light via said light inputs
   a high reflectivity mirror disposed on said first side of said light transmissive medium
   a plurality of partial reflectivity mirrors disposed along said second side of said light transmissive medium; and
   a plurality of light outputs from said light transmissive medium corresponding to said plurality of partial reflectivity mirrors
   wherein the partial reflectivity mirrors comprise guided mode resonance mirrors or nanodot mirrors.

8. The system of claim 7, further comprising a plurality of lenses, each lens for collimating light to each of said plurality of light inputs.

9. The system of claim 7, further comprising a plurality of high reflectivity mirrors disposed on said second side of said light transmissive medium for reflecting and collimating light to said light transmissive medium.

10. The system of claim 7, wherein the plurality of light outputs are arranged in a two-dimensional M×N array.

11. The system of claim 7, wherein the power at said light outputs is substantially uniform.

12. The system of claim 7, wherein at least one of said guided mode resonance mirrors acts as a tilted mirror.

13. The system of claim 7, wherein at least one of said guided mode resonance mirrors acts as a curved mirror.

* * * * *

UNITED STATES PATENT AND TRADEMARK OFFICE
CERTIFICATE OF CORRECTION

PATENT NO.         : 8,678,600 B2                              Page 1 of 1
APPLICATION NO.    : 13/387010
DATED              : March 25, 2014
INVENTOR(S)        : David A. Fattal et al.

It is certified that error appears in the above-identified patent and that said Letters Patent is hereby corrected as shown below:

In the Claims

Column 8, line 11, in Claim 7, delete "inputs" and insert -- inputs; --, therefor.

Column 8, line 13, in Claim 7, delete "medium" and insert -- medium; --, therefor.

Column 8, line 18, in Claim 7, delete "mirrors" and insert -- mirrors, --, therefor.

Signed and Sealed this
Thirtieth Day of September, 2014

Michelle K. Lee
*Deputy Director of the United States Patent and Trademark Office*